A. C. KENWORTHY.
FRICTION VARIABLE SPEED TRANSMISSION MECHANISM.
APPLICATION FILED MAY 10, 1919.
1,361,466.
Patented Dec. 7, 1920.
2 SHEETS—SHEET 1.
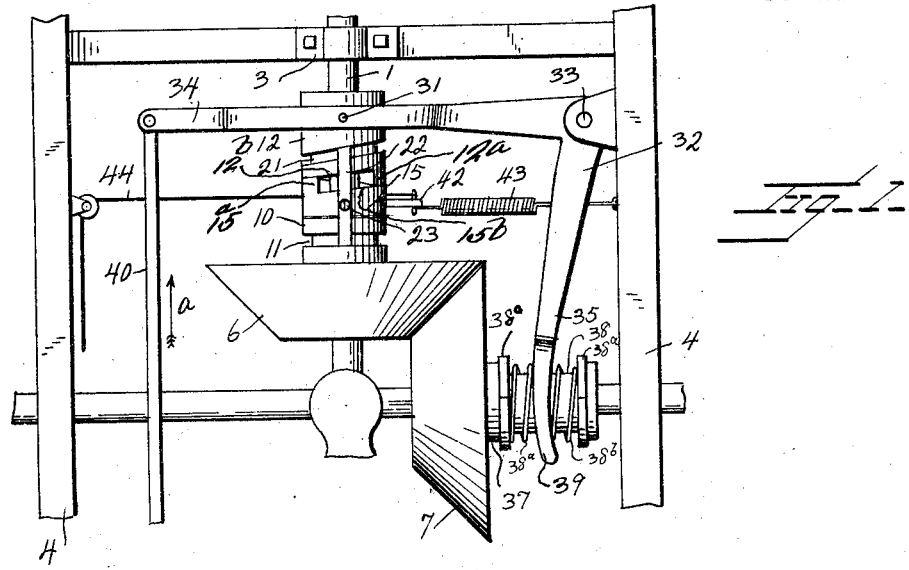
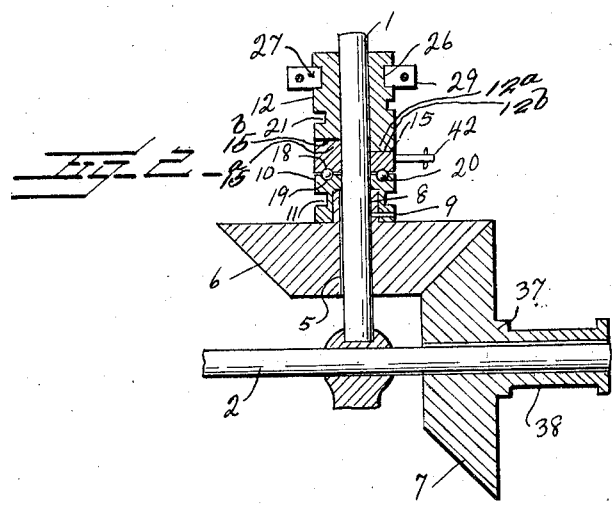
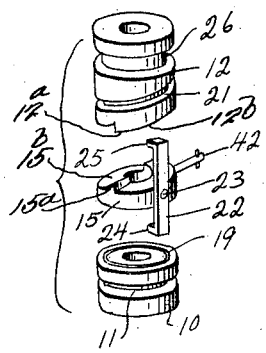
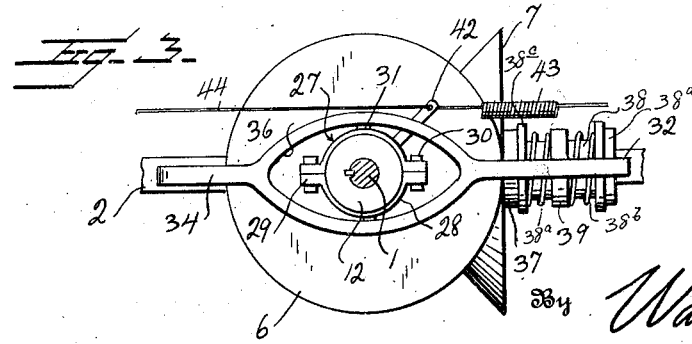
Inventor
A. C. Kenworthy
By Watson E. Coleman
Attorney

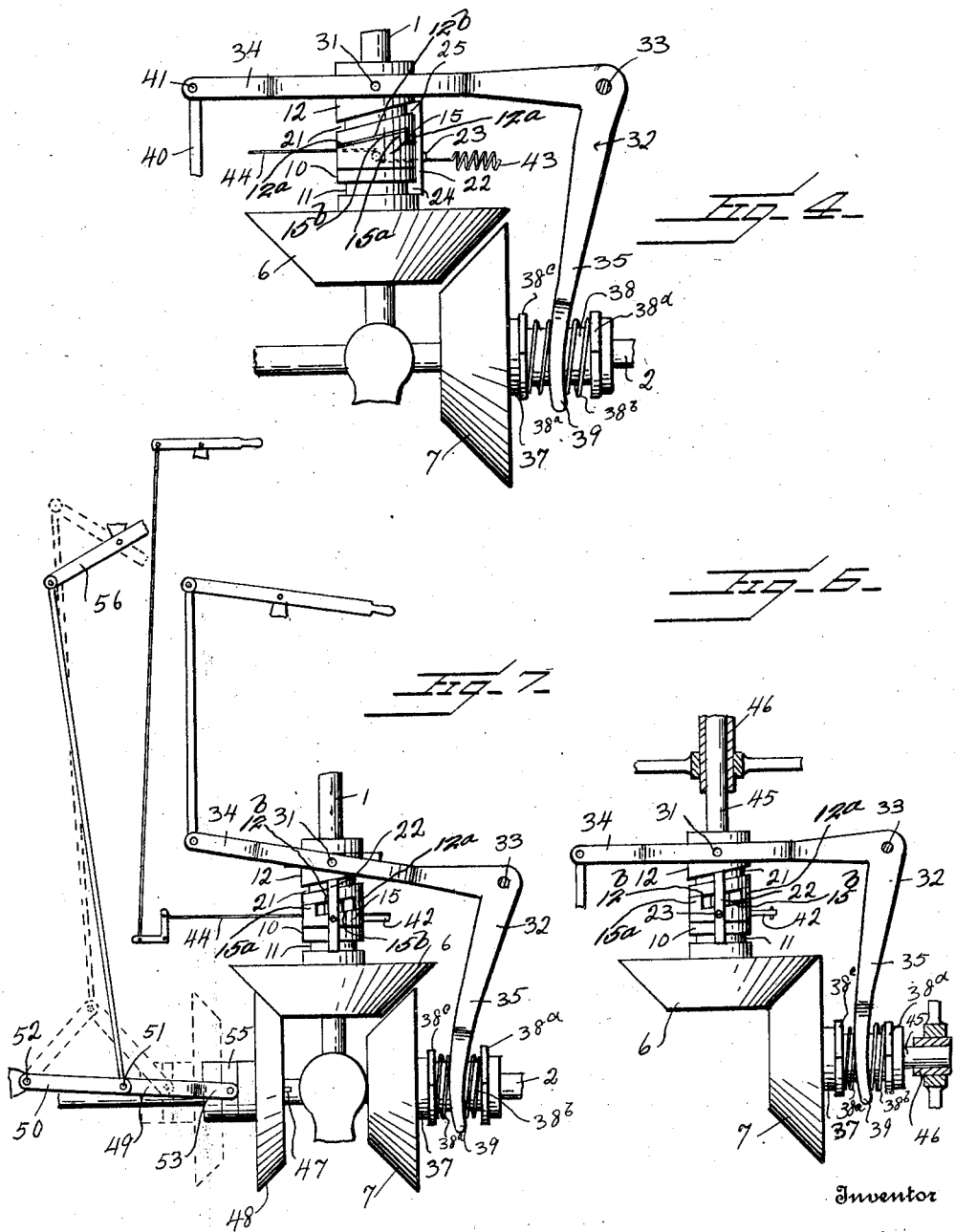

UNITED STATES PATENT OFFICE.

ALVIN C. KENWORTHY, OF WALLA WALLA, WASHINGTON.

FRICTION VARIABLE-SPEED-TRANSMISSION MECHANISM.

1,361,466.     Specification of Letters Patent.      Patented Dec. 7, 1920.

Application filed May 10, 1919. Serial No. 296,228.

*To all whom it may concern:*

Be it known that I, ALVIN C. KENWORTHY, a citizen of the United States, residing at Walla Walla, in the county of Walla Walla and State of Washington, have invented certain new and useful Improvements in Friction Variable - Speed - Transmission Mechanism, of which the following is a specification, reference being had to the accompanying drawings.

This invention relates to an improved combination friction variable speed transmission mechanism, and it is the aim of the present invention to provide a mechanism of this kind between driving and driven members, whereby the driven member may be operated at different speeds with relation to the driving member.

A further object of the invention involves the provision of frictional elements respectively carried on the driving and driven members, in combination with means whereby said elements (which are at right angles to each other) may be moved toward and from each other, and during such movements of the elements while the driven member is in operation, said elements remain in constant frictional contact.

The invention further aims to provide means for adjusting the element of the driving member with respect to the element on the driven member, whereby the driven member may be active or inactive, in so far as furnishing power is concerned.

The invention further aims to provide a bell crank lever so mounted on a conventional frame, as to be actuated, for shifting the frictional elements.

A further object of the invention is the provision of improved means of connection between one arm of this lever and the element on the driving member, whereby when the lever is actuated the element on the driving member may be adjusted, the element on the driven member being correspondingly adjusted and in unison.

A further object of the invention is to provide means for adjusting the element of the driving member with respect to one arm of the lever, whereby said element may be actuated toward and from the element on the driven member, whereby the driven member may be thrown into and out of operation.

The invention further aims to provide means for reversing the operation of the driven member.

The construction of the transmission mechanism at the present time is deemed preferable. However, in reducing the invention to a practical form for commercial purposes certain alterations may be found necessary. The right to these alterations is claimed, provided they fall within the limits of what is claimed.

The invention comprises further features and combination of parts, as will be hereinafter set forth, shown in the drawings, and claimed.

In the drawings:

Figure 1 is a view in plan illustrating the improved combination variable speed transmission mechanism as applied to driving and driven members, a conventional form of frame being shown for the support of the parts of the mechanism.

Fig. 2 is a vertical section viewed through the mechanism.

Fig. 3 is a view in elevation.

Fig. 4 is a view in plan illustrating the elements of the driving and driven members out of contact.

Fig. 5 illustrates collective views of the connections between the bell crank lever and the element on the driving member.

Figs. 6 and 7 are views of modified forms of the invention; in Fig. 7 means is provided for reversing the operation of the driven member.

Referring more especially to the drawings 1 designates a driving member and 2 a driven member, there being a bearing 3 of the frame 4 for the support of the driving and driven members. Keyed at 5 and slidably mounted on the driving member is a beveled frictional element or cone 6, and similarly mounted on the driven member is a beveled frictional element or cone 7. These two elements 6 and 7 are at right angles to each other, and when one is driven by the other, they are in constant frictional contact.

The element 6 is provided with a hub 8, and fastened at 9 to the hub is a collar 10.

This collar is provided with an annular groove 11. Loosely mounted upon the driving member 1 is a cylindrical sleeve 12. A collar 15 is loosely mounted upon the driving member. The adjacent faces of the collar 15 and the hub 8 are provided with registering race-ways 18 and 19, for the reception of anti-frictional balls 20 which likewise reduce the friction of the moving parts to a minimum.

The sleeve 12 on its periphery is provided with a groove 21, which is obliquely disposed, corresponding to the faces 15 and 16. A strip or bar 22 is fastened by screws 23 to the collar 15. The opposite ends of this strip or bar are provided with lateral lugs 24 and 25 respectively engaging the grooves 11 and 21 of the collar 10 and the sleeve 12.

The upper portion of the sleeve 12 has an annular groove 26. A ring 27 engages in the groove 26. This ring comprises semi-circular parts 28, the arms 29 of which are bolted together as shown at 30. The ring 27 has at diametrically opposite points, lugs 31. Pivotally mounted upon the frame 4 is a bell crank lever 32, the pivot of which is designated by the numeral 33. This lever 32 is supplied with arms 34 and 35. The arm 34 is supplied with an elongated opening 36, in the opposite walls of which the lugs 31 of the ring 27 are mounted.

The element 7 has a hub 37 provided with an annular groove 38. The arm 35 of the lever 32 is formed with fork 39, engaging the groove 38 of the head 37. A shift link 40 is provided, and is connected at 41 to the arm 34 of the lever 32. It is obvious that when shifting the link or member 40 in the direction of the arrow $a$ the beveled frictional elements 6 will be correspondingly moved. Since the arm 35 of the lever 32 has its fork engaging the groove 38, the beveled frictional element 7 will be moved in a direction toward the driving member 1, the elements 6 and 7 remaining in constant frictional contact, the speed of the driven member 2 being reduced. By moving the member or link 40 in the opposite direction, the cone frictional elements still remaining in contact are shifted, that is to say, the element 7 away from the element 6, and the element 6 toward the element 7, thereby increasing the speed of the driven member.

Carried by the collar 15 is an arm 42. A spring 43 has one end connected to the arm 42 and its other end to a portion of the frame 4. The tension of this spring holds the collar 15 in such a position that the frictional element 6 is held out of contact with the element 7. A suitable cable or cord 44 is connected to the arm 42 and by imparting a pulling action on the cord or cable the collar 15 may be partially rotated, and since the lug 25 is in engagement with the groove 21, the frictional element 6 will be moved in contact with the element 7. To cause this action the lug 25 cams in the groove 21.

In Fig. 6 the driving and driven members, consist of two telescopically united parts 45 and 46, the part 45 having a wide range of movement, whereby, upon moving the part 45, the element 7 may be gradually increased in speed, considerably beyond that attained by the mechanism in Figs. 1 to 4, inclusive.

As shown in Fig. 7 the driven member 2 has applied thereon as shown at 47 an additional frictional gear or member 48, which may be shifted into contact with the element 6 when the latter is out of frictional contact with the element 7, thereby reversing the speed of the driven member 2. Toggle levers 49 and 50 are provided, and are pivotally united as at 51. The lever 50 is pivotally mounted at 52 on the frame 4, and the lever 49 is provided with a fork 53. This fork is pivotally connected to a collar 54, which is fitted in a groove 55 of the frictional gear or member 48. It is obvious that by breaking the toggle levers as shown in dotted lines in Fig. 6 by operating the lever 56 the frictional gear or member may be moved out of contact with the element 6.

The adjacent faces of the sleeve 12 and the collar 15 are provided with semi-circular projections $12^a$ and $15^a$, the projection $12^a$ being carried by the sleeve 12 and the projection $15^a$ being carried by the collar 15. These projections have oppositely inclined cam faces $12^b$ and $15^b$, which are inclined correspondingly to the channel or groove 21, and are adapted to coöperate when the sleeve and the collar separate, thereby acting as a separating means between the sleeve and the collar, relieving a great deal of the strain upon the strip or bar 22.

In order to permit the gear 7 to easily and freely rotate relatively to the fork 39, a pair of split washers is mounted in the groove 38 of the hub or head 37, there being coil springs $38^a$ and $38^b$ engaging on either side of the fork 39, and engaging the split washers $38^c$ and $38^d$. By the provision of this construction, friction between the fork and the head or hub is prevented, and consequently will enable the gear to more freely rotate relatively to the forks.

The invention having been set forth, what is claimed as new is:

1. The combination with a driven member having a beveled frictional gear, of a driving member at right angles to the first member, and having a frictional gear coöperating with the first gear, a bell crank lever for shifting the said gears toward each other for varying the speed of the gear on the driven member, the gear of the driving member having a hub, a sleeve on the driving member and being connected to the lever and provided with a camming means, a revoluble shiftable device on the driving member interposed between the hub and the sleeve, and means carried by the shiftable device and being loosely connected to the hub, and in turn engaging the camming means, whereby upon shifting the device revolubly, the gear of the driving member will be moved out of contact with the gear of the driven member.

2. In a friction variable speed transmission, driving and driven shafts having frictional coöperative gears operatively shiftable on said shafts, each toward and from the other, means operatively connecting said gears for shifting them for varying the speed of the driven shaft, a sleeve on the driving member and being operatively connected to said means, a revoluble shiftable device on the driving member interposed between the friction gear of the driving member and the sleeve, means carried by the shiftable device and being loosely connected to the friction gear and in turn having a camming connection with the sleeve, whereby upon shifting the device revolubly, the gear of the driving member will be moved out of contact with the gear of the driven member.

3. In a friction variable speed transmission, driving and driven shafts having frictional coöperative gears operatively shiftable on said shafts, each toward and from the other, means operatively connecting said gears for shifting them for varying the speed of the driven shaft, a sleeve on the driving member and being operatively connected to said means, a revoluble shiftable device on the driving member interposed between the friction gear of the driving member and the sleeve, means carried by the shiftable device and being loosely connected to the friction gear and in turn having a camming connection with the sleeve, whereby upon shifting the device revolubly, the gear of the driving member will be moved out of contact with the gear of the driven member, and means for reversing the driven member in its movement.

In testimony whereof I hereunto affix my signature in the presence of two witnesses.

ALVIN C. KENWORTHY.

Witnesses:
E. F. BARKER,
C. McRADER.